US012358105B2

(12) United States Patent
Hattori

(10) Patent No.: US 12,358,105 B2
(45) Date of Patent: Jul. 15, 2025

(54) IMPACT TOOL AND METHOD FOR MANUFACTURING IMPACT WRENCH

(71) Applicant: MAKITA CORPORATION, Anjo (JP)

(72) Inventor: Tomoya Hattori, Anjo (JP)

(73) Assignee: MAKITA CORPORATION, Anjo (JP)

(*) Notice: Subject to any disclaimer, the term of this patent is extended or adjusted under 35 U.S.C. 154(b) by 48 days.

(21) Appl. No.: 18/378,210

(22) Filed: Oct. 10, 2023

(65) Prior Publication Data

US 2024/0157521 A1 May 16, 2024

(30) Foreign Application Priority Data

Nov. 15, 2022 (JP) ................................ 2022-182869

(51) Int. Cl.
*B25B 21/02* (2006.01)
*B25F 5/00* (2006.01)

(52) U.S. Cl.
CPC .............. *B25B 21/02* (2013.01); *B25F 5/001* (2013.01)

(58) Field of Classification Search
CPC ................................ B25B 21/02; B25F 5/001
See application file for complete search history.

(56) References Cited

U.S. PATENT DOCUMENTS

| | | | | |
|---|---|---|---|---|
| 10,213,912 B2 * | 2/2019 | Kumagai | B25D 17/26 | |
| 2006/0180327 A1 * | 8/2006 | Nagasaka | B25B 21/02 | 173/128 |
| 2012/0000683 A1 * | 1/2012 | Nagasaka | B25B 21/026 | 173/93.5 |
| 2021/0162571 A1 * | 6/2021 | Kondo | B25B 21/026 | |
| 2022/0203512 A1 * | 6/2022 | Kondo | H02K 9/06 | |

FOREIGN PATENT DOCUMENTS

| | | | | |
|---|---|---|---|---|
| DE | 112017007191 T5 * | 11/2019 | B25B 19/00 | |
| JP | 2018-187700 A | 11/2018 | | |

* cited by examiner

*Primary Examiner* — Michelle Lopez
(74) *Attorney, Agent, or Firm* — Oliff PLC

(57) ABSTRACT

A leak of a lubricant oil contained in a hammer case is reduced. An impact tool includes a motor including a rotor, a striker rotatable by the rotor, an anvil strikable by the striker, a hammer case having an opening, an anvil bearing fixed to the hammer case inside the hammer case and supporting the anvil, a seal between the anvil bearing and the anvil inside the hammer case, and a support facing the opening and supporting the seal from a front. The support has a smaller inner diameter than the opening.

20 Claims, 12 Drawing Sheets

IMPACT TOOL AND METHOD FOR MANUFACTURING IMPACT WRENCH

CROSS-REFERENCE TO RELATED APPLICATIONS

This application claims the benefit of priority to Japanese Patent Application No. 2022-182869, filed on Nov. 15, 2022, the entire contents of which are hereby incorporated by reference.

BACKGROUND

1. Technical Field

The present disclosure relates to an impact tool and a method for manufacturing an impact wrench.

2. Description of the Background

In the field of impact tools, a known impact wrench is described in Japanese Unexamined Patent Application Publication No. 2018-187700.

BRIEF SUMMARY

An impact tool includes an anvil that is struck by a striker and a hammer case accommodating the striker and at least a part of the anvil. A lubricant oil contained in the hammer case may leak through an opening at the front end of the hammer case.

One or more aspects of the present disclosure are directed to a technique for reducing a leak of a lubricant oil contained in a hammer case.

A first aspect of the present disclosure provides an impact tool, including:

- a motor including a rotor;
- a striker rotatable by the rotor;
- an anvil strikable by the striker:
- a hammer case having an opening;
- an anvil bearing fixed to the hammer case inside the hammer case, the anvil bearing supporting the anvil;
- a seal between the anvil bearing and the anvil inside the hammer case; and
- a support facing the opening and supporting the seal from a front, the support having a smaller inner diameter than the opening.

A second aspect of the present disclosure provides an impact tool, including:

- a motor including a rotor;
- a striker rotatable by the rotor;
- an anvil strikable by the striker;
- a hammer case accommodating the striker and a part of the anvil, the hammer case having an opening receiving the anvil;
- an anvil bearing fixed to the hammer case inside the hammer case, the anvil bearing supporting the anvil;
- a seal between the anvil bearing and the anvil inside the hammer case, the seal being retained by the anvil bearing; and
- a support supporting the seal and having a smaller inner diameter than the opening.

A third aspect of the present disclosure provides a method for manufacturing an impact wrench, the method including:

- manufacturing a first impact wrench including a first anvil shaft, a first hammer case, a first anvil bearing between the first anvil shaft and the first hammer case, and a first seal retained by a support separate from the first hammer case; and
- manufacturing a second impact wrench including a second anvil shaft having a larger outer diameter than the first anvil shaft, the first hammer case, a second anvil bearing between the second anvil shaft and the first hammer case, and a second seal retained by the first hammer case.

The impact tool according to the above aspects of the present disclosure reduces a leak of the lubricant oil contained in the hammer case.

DETAILED DESCRIPTION

One or more embodiments will now be described with reference to the drawings. In the embodiments, the positional relationships between the components will be described using the directional terms such as right and left (or lateral), front and rear (or frontward and rearward), and up and down (or vertical). The terms indicate relative positions or directions with respect to the center of an impact tool 1. The impact tool 1 includes a motor 6 as a power source.

In the embodiments, a direction parallel to a rotation axis AX of the motor 6 is referred to as an axial direction for convenience. A direction about the rotation axis AX is referred to as a circumferential direction or circumferentially, or a rotation direction for convenience. A direction radial from the rotation axis AX is referred to as a radial direction or radially for convenience.

The rotation axis AX extends in the front-rear direction. A first axial direction is from the rear to the front. A second axial direction is from the front to the rear. A position nearer the rotation axis AX in the radial direction, or a radial direction toward the rotation axis AX, is referred to as radially inward for convenience. A position farther from the rotation axis AX in the radial direction, or a radial direction away from the rotation axis AX, is referred to as radially outward for convenience.

Impact Tool

Figure 1:
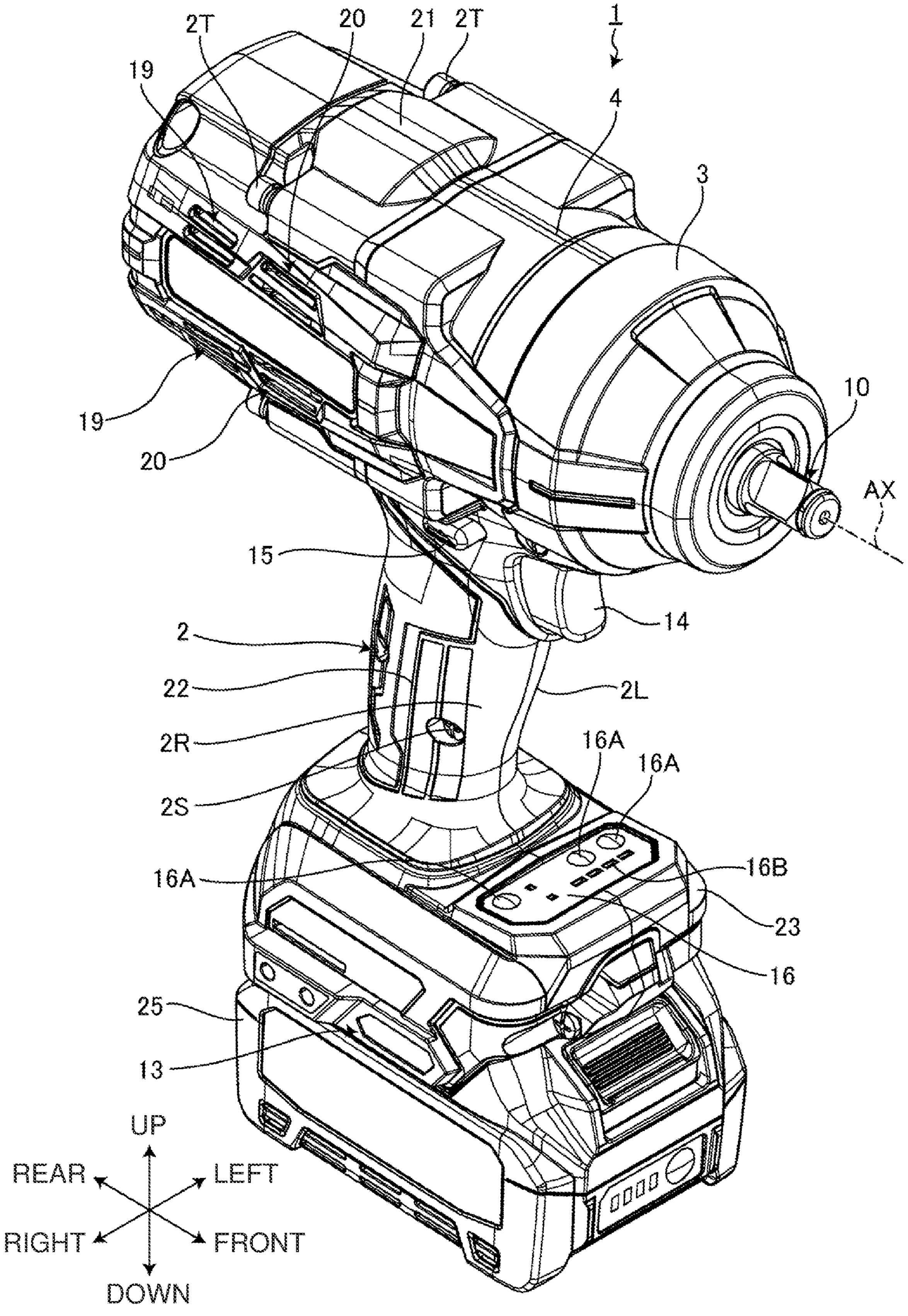
FIG. 1 is a perspective view of an impact tool according to an embodiment as viewed from the right front.
Figure 2:
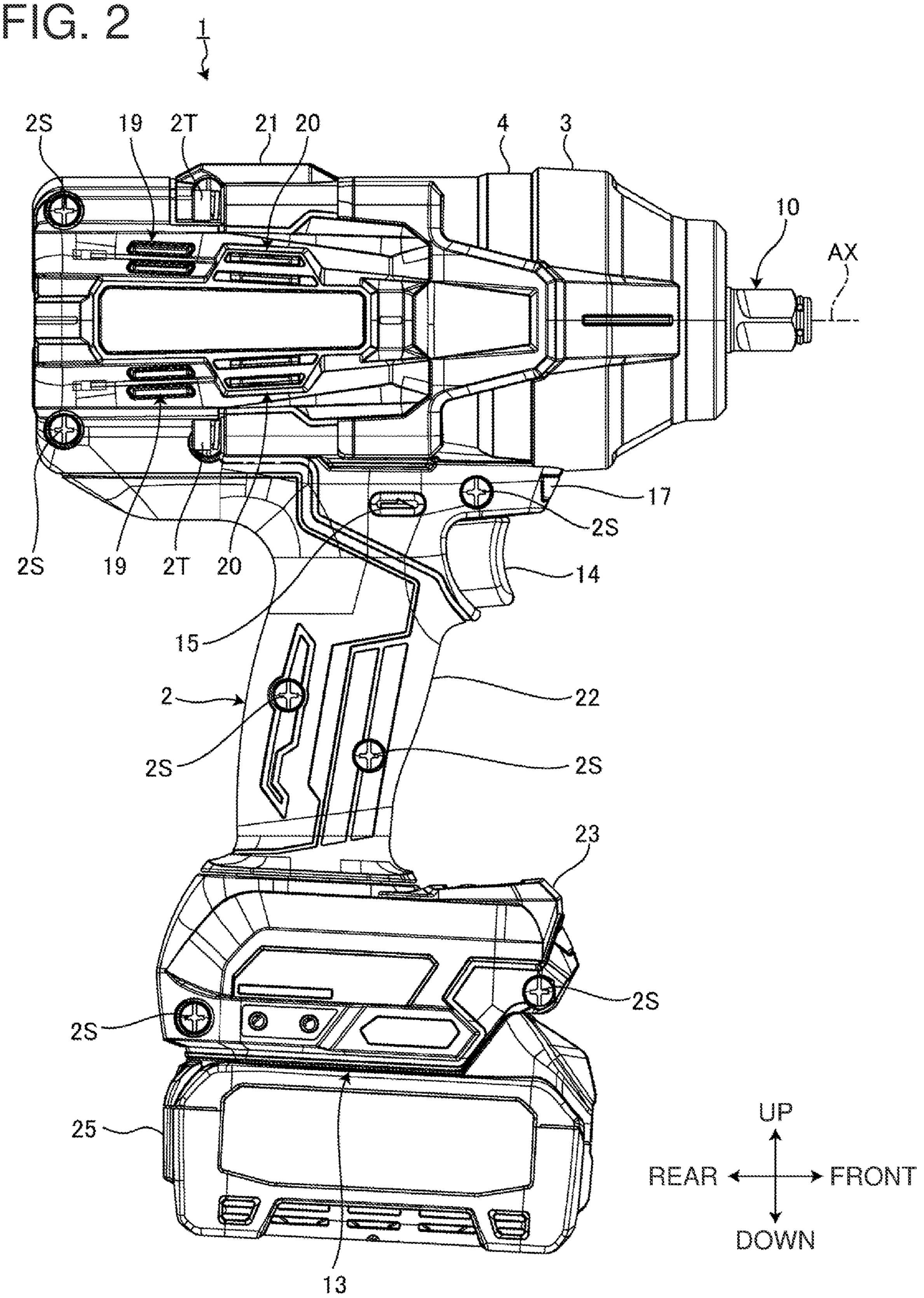
FIG. 2 is a side view of the impact tool according to the embodiment.
Figure 3:
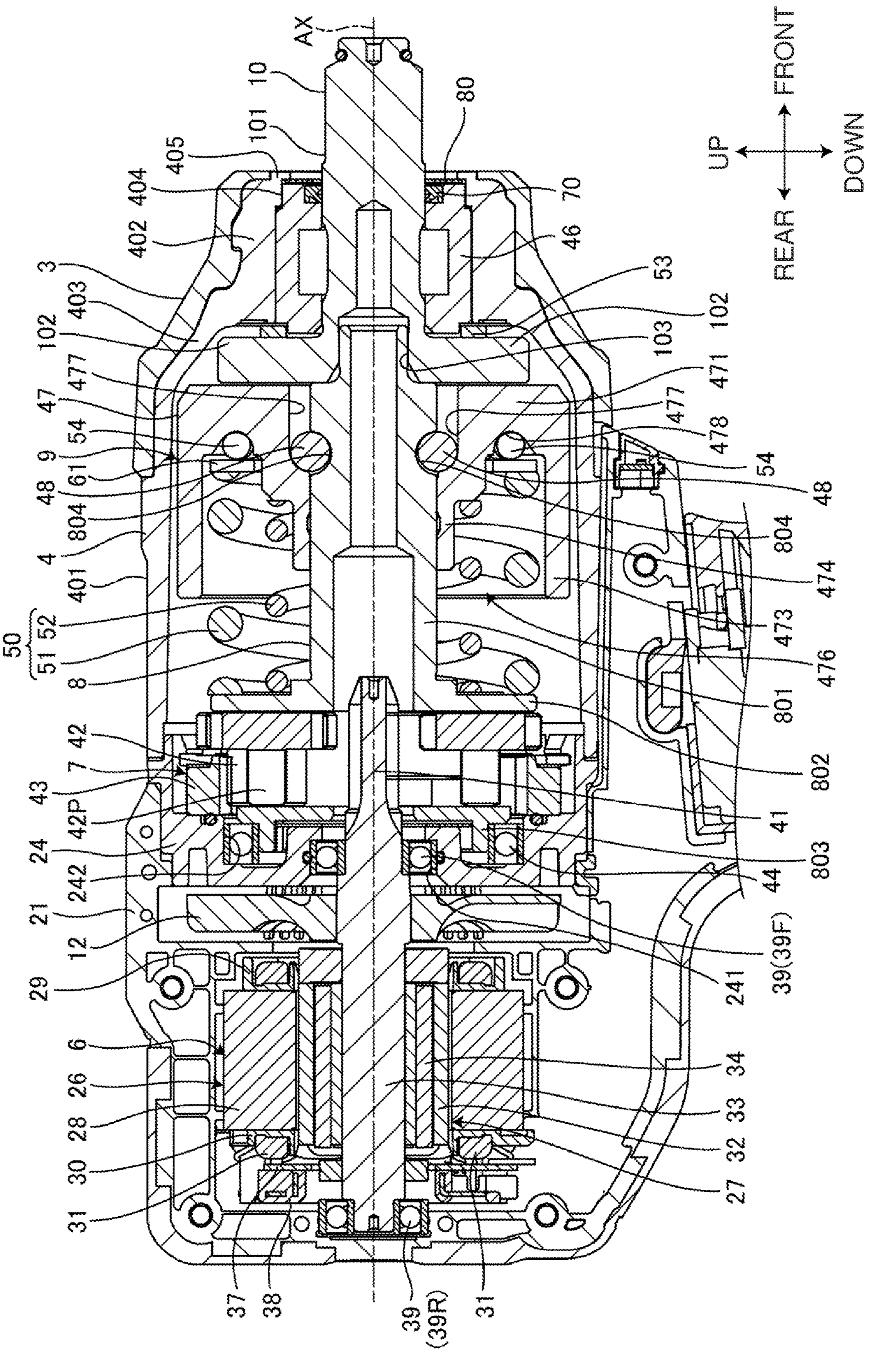
FIG. 3 is a longitudinal sectional view of an upper portion of the impact tool according to the embodiment.
Figure 4:
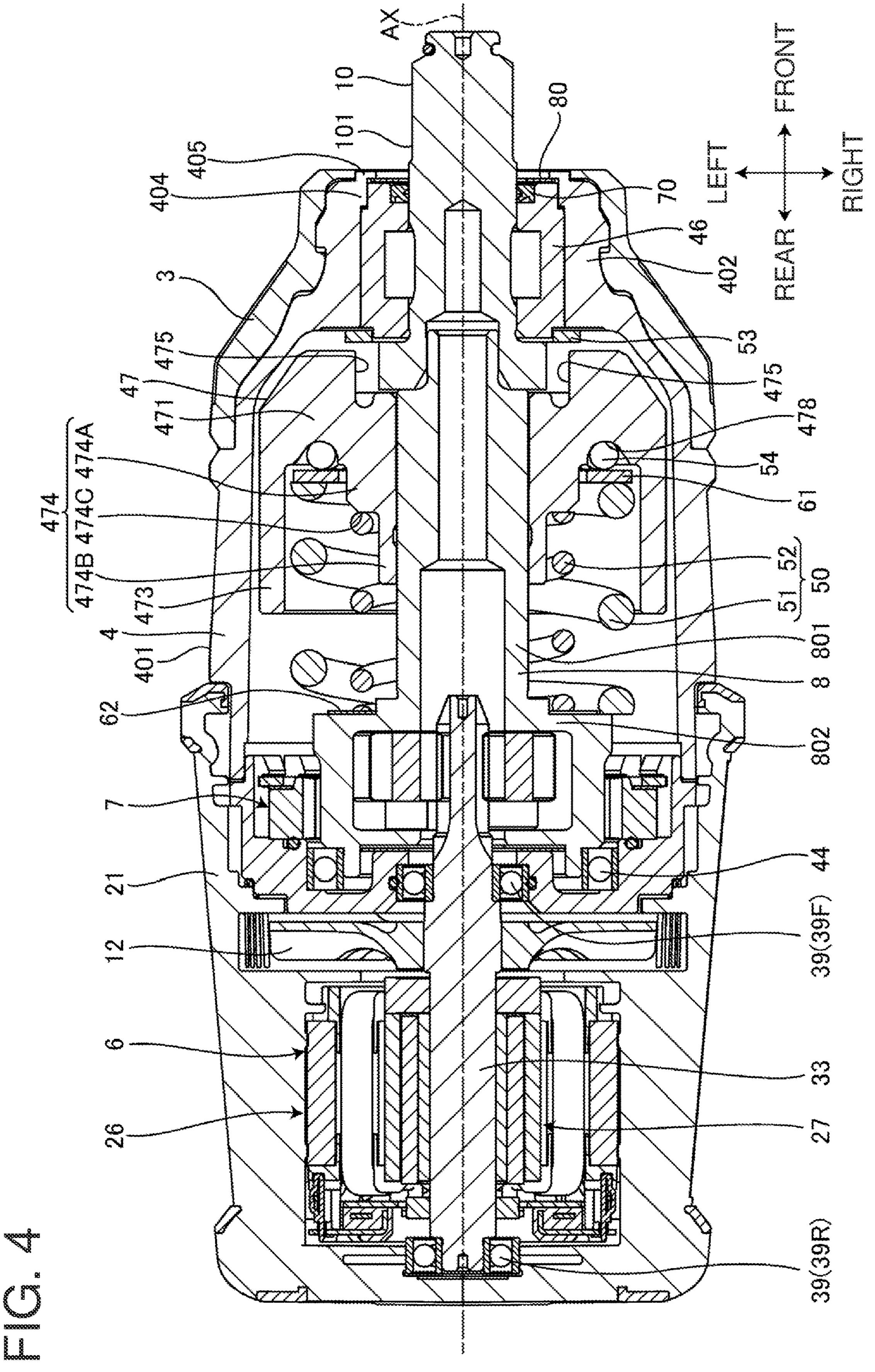
FIG. 4 is a horizontal sectional view of the upper portion of the impact tool according to the embodiment.
Figure 5:
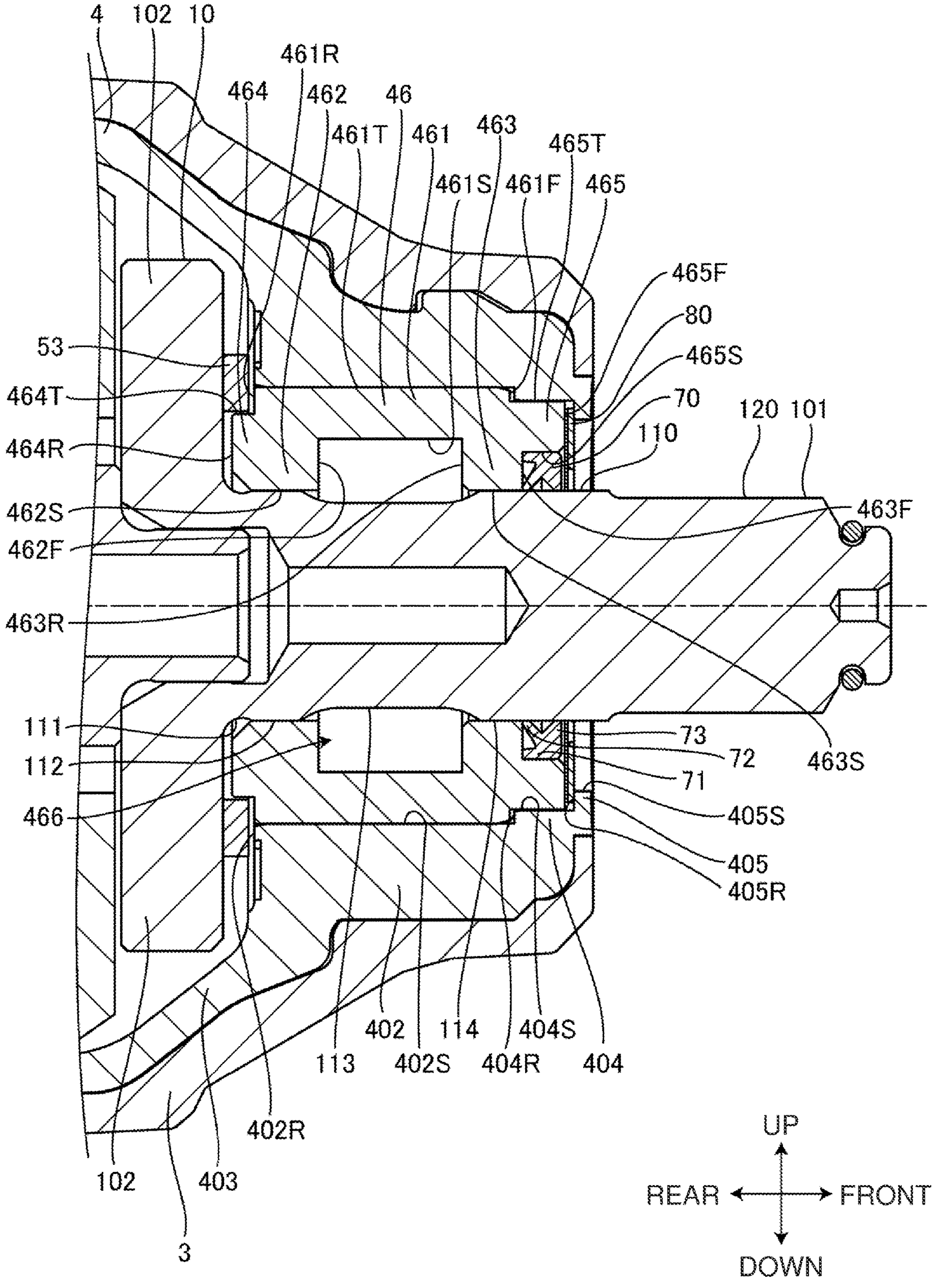
FIG. 5 is a partially enlarged longitudinal sectional view of the impact tool according to the embodiment.
Figure 6:
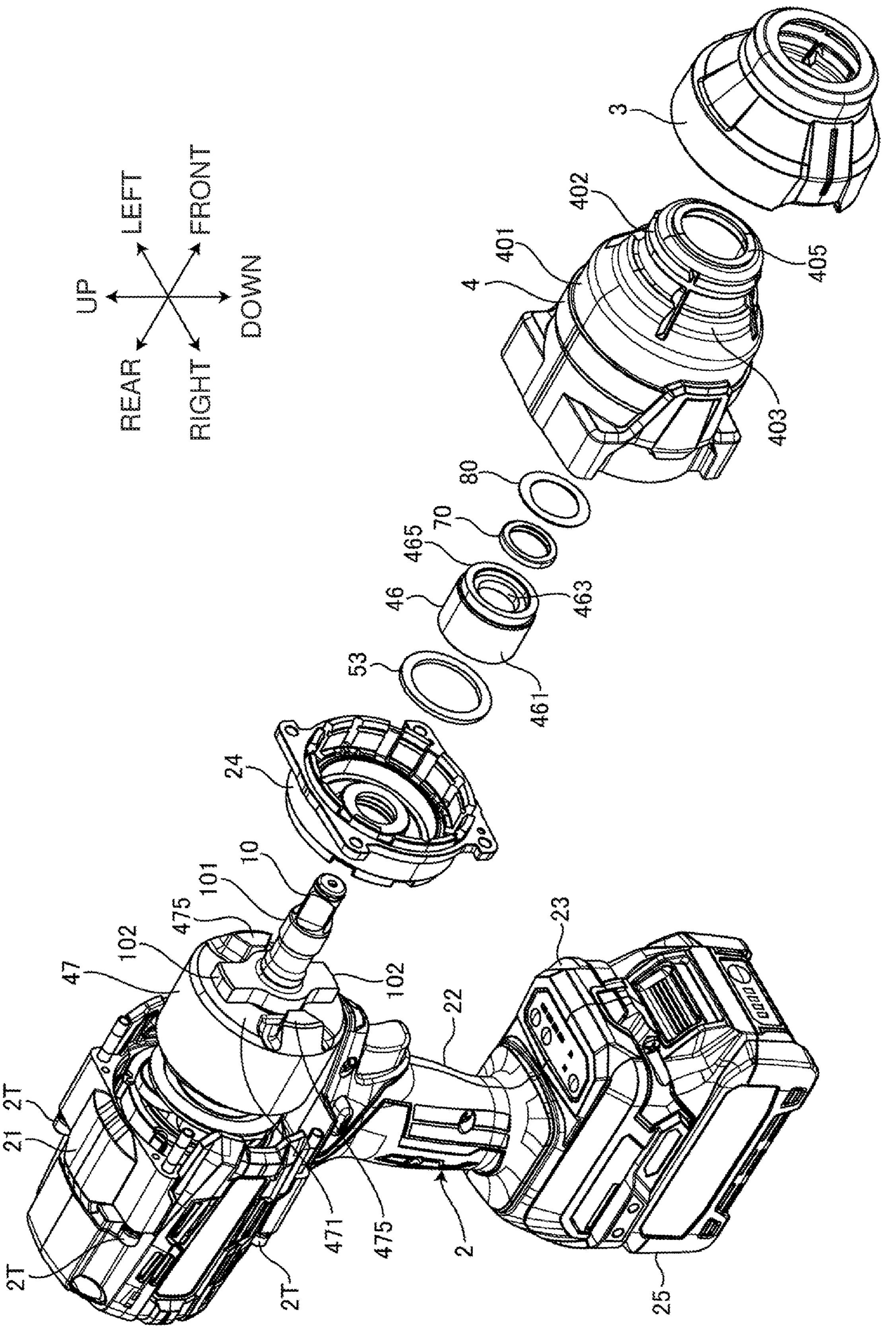
FIG. 6 is an exploded perspective view of the impact tool according to the embodiment as viewed from the right front.

FIG. 1 is a perspective view of the impact tool 1 according to an embodiment as viewed from the right front. FIG. 2 is a side view of the impact tool 1. FIG. 3 is a longitudinal sectional view of an upper portion of the impact tool 1. FIG. 4 is a horizontal sectional view of the upper portion of the impact tool 1. FIG. 5 is a partially enlarged longitudinal sectional view of the impact tool 1. FIG. 6 is an exploded perspective view of the impact tool 1 as viewed from the right front.

The impact tool 1 according to the embodiment is an impact wrench. The impact tool 1 includes a housing 2, a hammer case 4, a cover 3, the motor 6, a reducer 7, a spindle 8, a striker 9, an anvil 10, a fan 12, a battery mount 13, a trigger lever 14, a forward-reverse switch lever 15, an operation display 16, a light 17, a seal 70, and a support 80.

The housing 2 is formed from a synthetic resin. The housing 2 in the embodiment is formed from nylon. The housing 2 includes a left housing 2L and a right housing 2R. The right housing 2R is located on the right of the left housing 2L. The left housing 2L and the right housing 2R are fastened together with multiple screws 2S. The housing 2 includes a pair of housing halves.

The housing 2 includes a motor compartment 21, a grip 22, and a battery holder 23.

The motor compartment 21 accommodates the motor 6. The motor compartment 21 and the hammer case 4 are fastened together with multiple screws 2T.

The grip 22 is grippable by an operator. The grip 22 extends downward from the motor compartment 21. The trigger lever 14 is located in an upper portion of the grip 22.

The battery holder 23 holds a battery pack 25 with the battery mount 13. The battery holder 23 is connected to the lower end of the grip 22. The battery holder 23 has larger outer dimensions than the grip 22 in the front-rear direction and in the lateral direction.

The motor compartment 21 has inlets 19 and outlets 20. The outlets 20 are located frontward from the inlets 19. Air outside the housing 2 flows into an internal space of the housing 2 through the inlets 19, and then flows out of the housing 2 through the outlets 20.

The hammer case 4 accommodates a part of the reducer 7. The hammer case 4 accommodates a part of the spindle 8. The hammer case 4 accommodates the striker 9. The hammer case 4 accommodates a part of the anvil 10. The reducer 7 and the spindle 8 are partially located inside a bearing box 24. The reducer 7 includes multiple gears.

The hammer case 4 is formed from a metal. The hammer case 4 in the embodiment is formed from aluminum. The hammer case 4 is cylindrical. The hammer case 4 is located in front of the motor compartment 21. The hammer case 4 accommodates the bearing box 24.

The cover 3 covers at least apart of the outer surface of the hammer case 4. The cover 3 in the embodiment covers a front portion of the outer surface of the hammer case 4.

The motor 6 is a power source for the impact tool 1. The motor 6 is an inner-rotor brushless motor. The motor 6 includes a stator 26 and a rotor 27. The stator 26 is fixed to the motor compartment 21. The rotor 27 is at least partially located inward from the stator 26. The rotor 27 rotates relative to the stator 26. The rotor 27 rotates about the rotation axis AX extending in the front-rear direction.

The reducer 7 connects the rotor 27 and the spindle 8 together. The reducer 7 transmits rotation of the rotor 27 to the spindle 8. The reducer 7 rotates the spindle 8 at a lower rotational speed than the rotor 27. The reducer 7 is located frontward from the motor 6. The reducer 7 includes a planetary gear assembly. The reducer 7 includes multiple gears. The rotor 27 rotates the gears in the reducer 7.

The spindle 8 rotates with a rotational force from the rotor 27 transmitted from the reducer 7. The spindle 8 is located frontward from at least a part of the motor 6. The spindle 8 is located frontward from the stator 26. The spindle 8 is at least partially located frontward from the rotor 27. The spindle 8 is at least partially located frontward from the reducer 7. The spindle 8 is located rearward from the anvil 10.

The striker 9 strikes the anvil 10 in the rotation direction in response to a rotational force of the spindle 8 rotated by the motor 6. A rotational force from the motor 6 is transmitted to the striker 9 through the reducer 7 and the spindle 8.

The anvil 10 is an output shaft in the impact tool 1 that rotates in response to a rotational force of the rotor 27. The anvil 10 is located frontward from the motor 6. The anvil receives a socket as one type of tip tool on its front end. The anvil 10 is located frontward from at least a part of the spindle 8.

The fan 12 generates an airflow for cooling the motor 6. The fan 12 is located frontward from the stator 26 in the motor 6. The fan 12 is fastened to at least a part of the rotor 27. As the fan 12 rotates, air outside the motor compartment 21 flows into an internal space of the motor compartment 21 through the inlets 19 to cool the motor 6. As the fan 12 rotates, the air passing through the internal space of the motor compartment 21 flows out of the motor compartment 21 through the outlets 20.

The battery pack 25 is attached to the battery mount 13 in a detachable manner. The battery mount 13 is located in a lower portion of the battery holder 23. The battery pack 25 is placed onto the battery mount 13 from the front of the battery holder 23 and is thus attached to the battery mount 13. The battery pack 25 is pulled forward along the battery mount 13 and is thus detached from the battery mount 13. The battery pack 25 includes a secondary battery. The battery pack 25 in the embodiment includes a rechargeable lithium-ion battery. The battery pack 25 is attached to the battery mount 13 to power the impact tool 1. The motor 6 is driven by power supplied from the battery pack 25.

The trigger lever 14 is operable by the operator to activate the motor 6. The trigger lever 14 is operable to switch the motor 6 between the driving state and the stopped state. The trigger lever 14 is located on the grip 22.

The forward-reverse switch lever 15 is operable by the operator. The forward-reverse switch lever 15 is operable to switch the rotation direction of the motor 6 between forward and reverse. Switching the rotation direction of the motor 6 switches the rotation direction of the spindle 8. The forward-reverse switch lever 15 is located above the grip 22.

The operation display 16 includes multiple operation buttons 16A and an indicator 16B. The operation buttons 16A are operable by the operator to change the operation mode of the motor 6. The indicator 16B includes multiple light emitters. The indicator 16B indicates the operation mode of the motor 6 by changing the lighting patterns of the multiple light emitters. The operation display 16 is located on the battery holder 23. The operation display 16 is located on the upper surface of the battery holder 23 frontward from the grip 22.

The light 17 emits illumination light. The light 17 illuminates the anvil 10 and an area around the anvil 10 with illumination light. The light 17 illuminates an area ahead of the anvil 10 with illumination light. The light 17 also illuminates the tip tool attached to the anvil 10 and an area around the tip tool with illumination light. The light 17 is located above the trigger lever 14.

The hammer case 4 includes a first cylinder 401, a second cylinder 402, a case connector 403, a third cylinder 404, and a fourth cylinder 405. The first cylinder 401 surrounds the striker 9. The second cylinder 402 is located frontward from the first cylinder 401. The second cylinder 402 has a smaller outer diameter than the first cylinder 401. The case connector 403 connects a front portion of the first cylinder 401 and a rear portion of the second cylinder 402. The third cylinder 404 is located frontward from the second cylinder 402. The fourth cylinder 405 is located frontward from the third cylinder 404. The second cylinder 402 has a smaller inner diameter than the first cylinder 401. The third cylinder 404 has a smaller inner diameter than the second cylinder 402. The fourth cylinder 405 has a smaller inner diameter than the third cylinder 404.

As shown in FIG. 5, the second cylinder 402 has a rear surface 402R facing rearward and an inner circumferential surface 402S facing radially inward. The third cylinder 404 has a rear surface 404R facing rearward and an inner circumferential surface 404S facing radially inward. The fourth cylinder 405 has a rear surface 405R facing rearward and an inner circumferential surface 405S facing radially inward. The front end of the inner circumferential surface 402S is connected to the outer end of the rear surface 404R in the radial direction. The front end of the inner circumferential surface 404S is connected to the outer end of the rear surface 405R in the radial direction. The inner circumferential surface 405S defines an opening of the hammer case 4 at the front end of the hammer case 4.

The motor 6 includes the stator 26 and the rotor 27. The stator 26 includes a stator core 28, a front insulator 29, a rear insulator 30, and multiple coils 31. The rotor 27 rotates about the rotation axis AX. The rotor 27 includes a rotor core 32, a rotor shaft 33, and a rotor magnet 34.

The stator core 28 is located radially outward from the rotor 27. The stator core 28 includes multiple steel plates stacked on one another. The steel plates are metal plates formed from iron as a main component. The stator core 28 is cylindrical. The stator core 28 includes multiple teeth to support the coils 31.

The front insulator 29 is located on the front of the stator core 28. The rear insulator 30 is located on the rear of the stator core 28. The front insulator 29 and the rear insulator 30 are electrical insulating members formed from a synthetic resin. The front insulator 29 partially covers the surfaces of the teeth. The rear insulator 30 partially covers the surfaces of the teeth.

The coils 31 are attached to the stator core 28 with the front insulator 29 and the rear insulator 30 in between. The coils 31 surround the teeth on the stator core 28 with the front insulator 29 and the rear insulator 30 in between. The coils 31 and the stator core 28 are electrically insulated from each other with the front insulator 29 and the rear insulator 30. The multiple coils 31 are connected to one another with a busbar unit 38.

The rotor core 32 and the rotor shaft 33 are formed from steel. The rotor shaft 33 is located inward from the rotor core 32. The rotor core 32 is fixed to the rotor shaft 33. The rotor shaft 33 has a front end protruding frontward from the front end face of the rotor core 32. The rotor shaft 33 has a rear end protruding rearward from the rear end face of the rotor core 32. The rotor magnet 34 is fixed to the rotor core 32. The rotor magnet 34 is located inside the rotor core 32.

A sensor board 37 is attached to the rear insulator 30. The sensor board 37 includes a circuit board and a rotation detector. The circuit board is circular and has a hole at the center. The rotation detector is supported on the circuit board. The sensor board 37 at least partially faces the rotor magnet 34. The rotation detector detects the position of the rotor magnet 34 in the rotor 27 to detect the position of the rotor 27 in the rotation direction.

The rotor shaft 33 is rotatably supported by rotor bearings 39. The rotor bearings 39 include a front rotor bearing 39F and a rear rotor bearing 39R. The front rotor bearing 39F supports the front end of the rotor shaft 33 in a rotatable manner. The rear rotor bearing 39R supports the rear end of the rotor shaft 33 in a rotatable manner.

The front rotor bearing 39F is held by the bearing box 24. The bearing box 24 has a recess 241. The recess 241 is recessed frontward from the rear surface of the bearing box 24. The front rotor bearing 39F is received in the recess 241. The rear rotor bearing 39R is held by a rear portion of the motor compartment 21. The front end of the rotor shaft 33 is located inside the hammer case 4 through an opening of the bearing box 24.

The fan 12 is fixed to the front of the rotor shaft 33. The fan 12 is located between the front rotor bearing 39F and the stator 26. As the rotor shaft 33 rotates, the fan 12 rotates together with the rotor shaft 33.

A pinion gear 41 is located on the front end of the rotor shaft 33. The pinion gear 41 is connected to at least a part of the reducer 7. The rotor shaft 33 is connected to the reducer 7 with the pinion gear 41.

The reducer 7 includes multiple planetary gears 42 and an internal gear 43. The multiple planetary gears 42 surround the pinion gear 41. The internal gear 43 surrounds the multiple planetary gears 42. The pinion gear 41, the planetary gears 42, and the internal gear 43 are accommodated in the hammer case 4. Each planetary gear 42 meshes with the pinion gear 41. The planetary gears 42 are rotatably supported by the spindle 8 with a pin 42P. The spindle 8 is rotated by the planetary gears 42. The internal gear 43 includes internal teeth that mesh with the planetary gears 42. The internal gear 43 is fixed to the hammer case 4. The internal gear 43 is constantly nonrotatable relative to the hammer case 4.

When the rotor shaft 33 rotates as driven by the motor 6, the pinion gear 41 rotates, and the planetary gears 42 revolve about the pinion gear 41. The planetary gears 42 revolve while meshing with the internal teeth on the internal gear 43. The spindle 8, which is connected to the planetary gears 42 with the pin 42P in between, rotates at a lower rotational speed than the rotor shaft 33.

The spindle 8 rotates with a rotational force from the motor 6. The spindle 8 transmits the rotational force from the motor 6 to the anvil 10 through the striker 9. The spindle 8 includes a spindle shaft 801 and a flange 802. The flange 802 is located on a rear portion of the spindle shaft 801. The planetary gears 42 are rotatably supported by the flange 802 with the pin 42P. The rotation axis of the spindle 8 aligns with the rotation axis AX of the motor 6. The spindle 8 rotates about the rotation axis AX. The spindle 8 is rotatably supported by a spindle bearing 44. The spindle 8 includes a protrusion 803 on its rear end. The protrusion 803 protrudes rearward from the flange 802. The spindle bearing 44 surrounds the protrusion 803.

The bearing box 24 at least partially surrounds the spindle 8. The spindle bearing 44 is held by the bearing box 24. The bearing box 24 has a recess 242. The recess 242 is recessed rearward from the front surface of the bearing box 24. The spindle bearing 44 is received in the recess 242.

The striker 9 includes a hammer 47, hammer balls 48, coil springs 50, and a washer 61. The striker 9 including the hammer 47, the hammer balls 48, the coil springs 50, and the washer 61 is accommodated in the first cylinder 401 in the hammer case 4. The first cylinder 401 surrounds the hammer 47.

The hammer 47 is located frontward from the reducer 7. The hammer 47 surrounds the spindle shaft 801. The hammer 47 is supported by the spindle shaft 801.

The hammer 47 is rotated by the motor 6. A rotational force from the motor 6 is transmitted to the hammer 47 through the reducer 7 and the spindle 8. The hammer 47 is rotatable together with the spindle 8 in response to a rotational force of the spindle 8 rotated by the motor 6. The rotation axis of the hammer 47 and the rotation axis of the spindle 8 align with the rotation axis AX of the motor 6. The hammer 47 rotates about the rotation axis AX.

The hammer 47 includes a base 471, a rear ring 473, a support ring 474, and hammer projections 475.

The base 471 surrounds the spindle shaft 801. The base 471 is annular. The spindle shaft 801 is located inward from the base 471.

The rear ring 473 protrudes rearward from the outer circumference of the base 471. The rear ring 473 is cylindrical. The rear ring 473 has a rear end located rearward from the rear end of the support ring 474.

The support ring 474 protrudes rearward from an inner circumference of the base 471. The support ring 474 is cylindrical. The support ring 474 surrounds the spindle shaft 801. The support ring 474 is supported by the spindle shaft 801 with the hammer balls 48 in between. The support ring 474 includes a larger-diameter portion 474A and a smaller-diameter portion 474B. The smaller-diameter portion 474B is located rearward from the larger-diameter portion 474A. The larger-diameter portion 474A has a larger outer diameter than the smaller-diameter portion 474B. A step 474C is at the boundary between the larger-diameter portion 474A and the smaller-diameter portion 474B.

The hammer projections 475 protrude frontward from the front surface of the base 471. The front surfaces of the hammer projections 475 are located frontward from the front surface of the base 471. The hammer projections 475 are two hammer projections 475 arranged circumferentially.

The rear surface of the base 471, the inner circumferential surface of the rear ring 473, and the outer circumferential surface of the support ring 474 define a recess 476. The recess 476 is located at the rear of the hammer 47. The recess 476 is recessed frontward from the rear surface of the hammer 47.

The hammer balls 48 are formed from a metal such as steel. The hammer balls 48 are between the spindle shaft 801 and the hammer 47. The spindle 8 has spindle grooves 804. The spindle grooves 804 receive at least parts of the hammer balls 48. The spindle grooves 804 are on the outer circumferential surface of the spindle shaft 801. The hammer 47 has hammer grooves 477. The hammer grooves 477 receive at least parts of the hammer balls 48. The hammer grooves 477 are on the inner circumferential surface of the support ring 474. Each hammer ball 48 is between the spindle groove 804 and the hammer groove 477. The hammer balls 48 roll along the spindle grooves 804 and the hammer grooves 477. The hammer 47 is movable together with the hammer balls 48. The spindle 8 and the hammer 47 are movable relative to each other in the axial direction and in the rotation direction within a movable range defined by the spindle grooves 804 and the hammer grooves 477.

The coil springs 50 surround the spindle shaft 801. The coil springs 50 in the embodiment include a first coil spring 51 and a second coil spring 52 located parallel to each other. The second coil spring 52 is located radially inward from the first coil spring 51. The first coil spring 51 in the embodiment has a greater spring constant than the second coil spring 52. The first coil spring 51 has a larger wire diameter than the second coil spring 52.

The rear end of the first coil spring 51 and the rear end of the second coil spring 52 are supported on the front surface of the flange 802. The rear end of the first coil spring 51 is in contact with the front surface of the flange 802. The rear end of the second coil spring 52 is supported on the front surface of the flange 802 with a washer 62 in between.

The first coil spring 51 and the second coil spring 52 have their front ends received in the recess 476. The washer 61 is received in the recess 476. The first coil spring 51 and the second coil spring 52 have their front ends supported by the washer 61. The washer 61 is annular. The first coil spring 51 and the second coil spring 52 each constantly generate an elastic force for moving the hammer 47 forward.

The washer 61 is located behind the base 471. The washer 61 supports the front end of the first coil spring 51 and the front end of the second coil spring 52. The washer 61 is between the rear ring 473 and the support ring 474 in the radial direction. The washer 61 is received in the recess 476. The washer 61 is supported by the hammer 47 with multiple support balls 54 in between. With the hammer 47 at the frontmost position in its movable range in the front-rear direction, the support balls 54 are located frontward from the rear ends of the hammer balls 48.

The support balls 54 are received in a support groove 478 inside the recess 476 on the hammer 47. In the present embodiment, the support groove 478 is located on the rear surface of the base 471. The support groove 478 is annular and surrounds the rotation axis AX. The support balls 54 support the washer 61.

The washer 61 is held between the coil springs 50 and the support balls 54 in the front-rear direction. The washer 61 is spaced from the hammer 47 and the spindle 8.

The anvil 10 includes an anvil shaft 101, anvil projections 102, and a recess 103.

The anvil shaft 101 extends in the axial direction (front-rear direction). The anvil shaft 101 is located frontward from the spindle 8 and the hammer 47. The anvil shaft 101 is at least partially received in the opening at the front end of the hammer case 4. The inner circumferential surface 405S of the fourth cylinder 405 defines the opening at the front end of the hammer case 4. The anvil shaft 101 has a front end protruding frontward through the opening of the hammer case 4. The anvil shaft 101 receives a socket as one type of tip tool on its front end.

The anvil projections 102 protrude radially outward from the rear end of the anvil shaft 101. The anvil projections 102 are struck by the hammer projections 475 in the rotation direction. A washer 53 is between the front surfaces of the anvil projections 102 and the rear surface 402R of the second cylinder 402. The washer 53 reduces contact between the anvil projections 102 and the second cylinder 402. The rear end of the second cylinder 402 receives an urging force from the anvil projections 102 through the washer 53.

The recess 103 is recessed frontward from a middle portion on the rear surface of the anvil 10. The front end of the spindle 8 is received in the recess 103.

The base 471 is located rearward from the anvil projections 102. The rear surfaces of the anvil projections 102 are in contact with or away from the front surface of the base 471.

The anvil 10 is rotatably supported by an anvil bearing 46. The rotation axis of the anvil 10, the rotation axis of the hammer 47, and the rotation axis of the spindle 8 align with the rotation axis AX of the motor 6. The anvil 10 rotates about the rotation axis AX. The anvil bearing 46 surrounds the anvil shaft 101. The anvil bearing 46 is partially located inside the second cylinder 402 in the hammer case 4. The anvil bearing 46 is partially located inside the third cylinder 404 in the hammer case 4. The anvil bearing 46 is held in the second cylinder 402 in the hammer case 4. The anvil bearing 46 is press-fitted in the second cylinder 402. The anvil bearing 46 is fixed to the hammer case 4 inside the hammer case 4. The anvil bearing 46 supports the anvil shaft 101 in a rotatable manner.

The anvil bearing 46 in the embodiment is an iron sleeve. As shown in FIG. 5, the anvil bearing 46 includes an outer ring 461, a rear support 462, a front support 463, a rear protrusion 464, and a front protrusion 465. The rear support 462 protrudes radially inward from a rear portion of the outer ring 461. The front support 463 protrudes radially inward from a front portion of the outer ring 461. The rear protrusion 464 protrudes rearward from the rear support 462. The front protrusion 465 protrudes frontward from the front support 463. The outer ring 461, the rear support 462, and the front support 463 define a recess 466 on the anvil bearing 46.

The outer ring 461 has a front surface 461F facing frontward, a rear surface 461R facing rearward, an inner circumferential surface 461S facing radially inward, and an outer circumferential surface 461T facing radially outward.

The rear support 462 has a front surface 462F facing frontward and an inner circumferential surface 462S facing radially inward.

The front support 463 has a front surface 463F facing frontward, a rear surface 463R facing rearward, and an inner circumferential surface 463S facing radially inward.

The rear protrusion 464 has a rear surface 464R facing rearward and an outer circumferential surface 464T facing radially outward.

The front protrusion 465 has a front surface 465F facing frontward, an inner circumferential surface 465S facing radially inward, and an outer circumferential surface 465T facing radially outward.

The outer circumferential surface 461T of the outer ring 461 is in contact with the inner circumferential surface 402S of the second cylinder 402. The inner circumferential surface 461S of the outer ring 461 is spaced from the outer circumferential surface of the anvil shaft 101. The inner circumferential surface 461S of the outer ring 461, the front surface 462F of the rear support 462, and the rear surface 463R of the front support 463 define the recess 466.

As described later, the anvil shaft 101 includes a rear columnar portion 112, a front columnar portion 114, and a recess 113. The inner circumferential surface 461S of the outer ring 461 faces the outer circumferential surface of the recess 113. The inner circumferential surface 462S of the rear support 462 is in contact with the outer circumferential surface of the rear columnar portion 112. The inner circumferential surface 463S of the front support 463 is in contact with the outer circumferential surface of the front columnar portion 114.

The washer 53 has a front surface with its radially outer edge facing the rear surface 402R of the second cylinder 402 and its radially inner edge facing the rear surface 461R of the outer ring 461. The inner circumferential surface of the washer 53 facing radially inward faces the outer circumferential surface 464T of the rear protrusion 464. The rear surface 464R of the rear protrusion 464 faces the front surface of the anvil projections 102 across a gap. The front surface 461F of the outer ring 461 faces the rear surface 404R of the third cylinder 404. The outer circumferential surface 465T of the front protrusion 465 is in contact with the inner circumferential surface 404S of the third cylinder 404.

The hammer projections 475 can come in contact with the anvil projections 102 in the rotation direction. When the motor 6 rotates with the hammer 47 and the anvil projections 102 in contact with each other in the rotation direction, the anvil 10 rotates together with the hammer 47 and the spindle 8.

The anvil 10 is struck by the hammer 47 in the rotation direction. When, for example, the anvil 10 receives a higher load during an operation for tightening a bolt, the anvil 10 can no longer rotate with urging forces from the coil springs 50 alone. This stops the rotation of the anvil 10 and the hammer 47. The spindle 8 and the hammer 47 are movable relative to each other in the axial direction and in the circumferential direction with the hammer balls 48 in between. When the hammer 47 stops rotating, the spindle 8 continues to rotate with power generated by the motor 6. When the hammer 47 stops rotating and the spindle 8 rotates, the hammer balls 48 move backward while being guided along the spindle groove 804 and the hammer groove 477. The hammer 47 receives a force from the hammer balls 48 to move backward with the hammer balls 48. In other words, the hammer 47 moves backward when the anvil 10 stops rotating and the spindle 8 rotates. Thus, the hammer 47 and the anvil projections 102 come out of contact from each other.

When moving backward, the hammer 47 rotates relative to the spindle shaft 801. The washer 61 is spaced from the hammer 47 and the spindle 8. The rotation of the hammer 47 is thus not restricted by the washer 61. The support balls 54 are between the washer 61 and the hammer 47. The support balls 54 rotate to allow the hammer 47 to rotate smoothly.

The coil springs 50 constantly generate elastic forces for moving the hammer 47 forward. The hammer 47 that has moved backward then moves forward under the elastic forces from the coil springs 50. When moving forward, the hammer 47 receives a force in the rotation direction from the hammer balls 48. In other words, the hammer 47 moves forward while rotating. The hammer projections 475 then come in contact with the anvil projections 102 while rotating. Thus, the anvil projections 102 are struck by the hammer projections 475 in the rotation direction. The anvil 10 receives power from the motor 6 and an inertial force from the hammer 47. The anvil 10 thus rotates about the rotation axis AX at high torque.

Seal and Support

The seal 70 is located inside the hammer case 4. The seal 70 is located radially inward from the third cylinder 404 in the hammer case 4. The seal 70 is between the anvil bearing 46 and the anvil shaft 101 inside the hammer case 4. The seal 70 is at least partially in contact with the outer circumferential surface of the anvil shaft 101. The seal 70 is supported by the anvil bearing 46. The seal 70 is retained by the anvil bearing 46. The seal 70 is located radially inward from the front protrusion 465 of the anvil bearing 46. The seal 70 in the embodiment is a lip seal.

The seal 70 seals the boundary between the anvil bearing 46 and the anvil shaft 101. The seal 70 reduces the likelihood that a lubricant oil (grease) contained in the hammer case 4 leaks outside the hammer case 4 through the opening at the front end of the hammer case 4. The seal 70 also reduces the likelihood that foreign objects outside the hammer case 4 enter the hammer case 4.

As shown in FIG. 5, the seal 70 includes an outer ring 71, a rear lip 72, and a front lip 73. The outer circumferential surface of the outer ring 71 facing radially outward is in contact with the inner circumferential surface 465S of the front protrusion 465. The rear surface of the outer ring 71 facing rearward is in contact with the front surface 463F of the front support 463. The rear lip 72 and the front lip 73 are located radially inward from the outer ring 71. The rear lip 72 is located rearward from the front lip 73. The rear lip 72 and the front lip 73 are in contact with the outer circumferential surface of the anvil shaft 101. The rear lip 72 and the front lip 73 are in contact with the outer circumferential surface of the front columnar portion 114.

The support 80 is located inside the hammer case 4. The support 80 is located frontward from the seal 70. The support 80 faces the seal 70. The support 80 supports the seal 70 from the front. The hammer case 4 has the opening, at its front end, receiving the anvil shaft 101. The inner circumferential surface 405S of the fourth cylinder 405 defines the opening of the hammer case 4. The support 80 faces the opening of the hammer case 4. The support 80 reduces the likelihood that the seal 70 slips off forward through the opening of the hammer case 4.

The support 80 is annular. The support 80 is a washer surrounding the anvil shaft 101. The support 80 is spaced from the anvil shaft 101.

The support 80 is fixed to at least one of the hammer case 4 or the anvil bearing 46. The support 80 in the embodiment is held between the anvil bearing 46 and a part of the hammer case 4 in the front-rear direction. In the embodiment, the support 80 has a radially outer edge held between the front surface 465F of the front protrusion 465 and the rear surface 405R of the fourth cylinder 405.

The support 80 is placed inside the hammer case 4 through an opening at the rear end of the hammer case 4. The support 80 is received inside the hammer case 4 with the front surface of the support 80 in contact with the rear surface 405R of the fourth cylinder 405. The seal 70 and the anvil bearing 46 are then placed inside the hammer case 4 through the opening at the rear end of the hammer case 4. The anvil bearing 46 is press-fitted into the second cylinder 402 and fixed to the hammer case 4. In response to the front surface 461F of the outer ring 461 being in contact with the rear surface 404R of the third cylinder 404, the hammer case 4 and the anvil bearing 46 are positioned in the front-rear direction.

The support 80 may surround a part of the anvil shaft 101. The support 80 may partially have cutouts. The support 80 may be a circlip. In this structure, the support 80 may be placed inside the hammer case 4 through the opening at the front end of the hammer case 4.

Anvil

Figure 7:
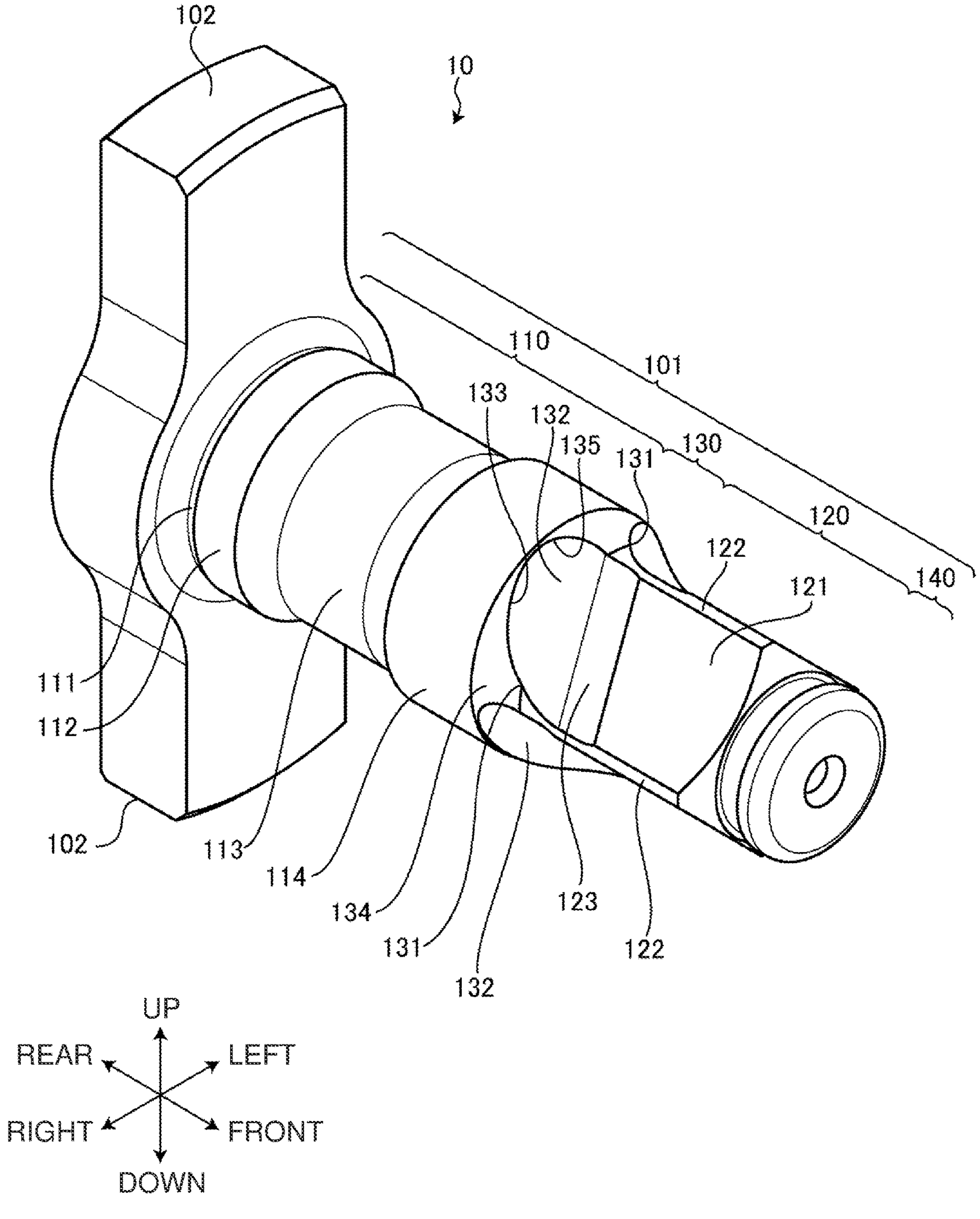
FIG. 7 is a perspective view of an anvil in the embodiment as viewed from the right front.
Figure 8:
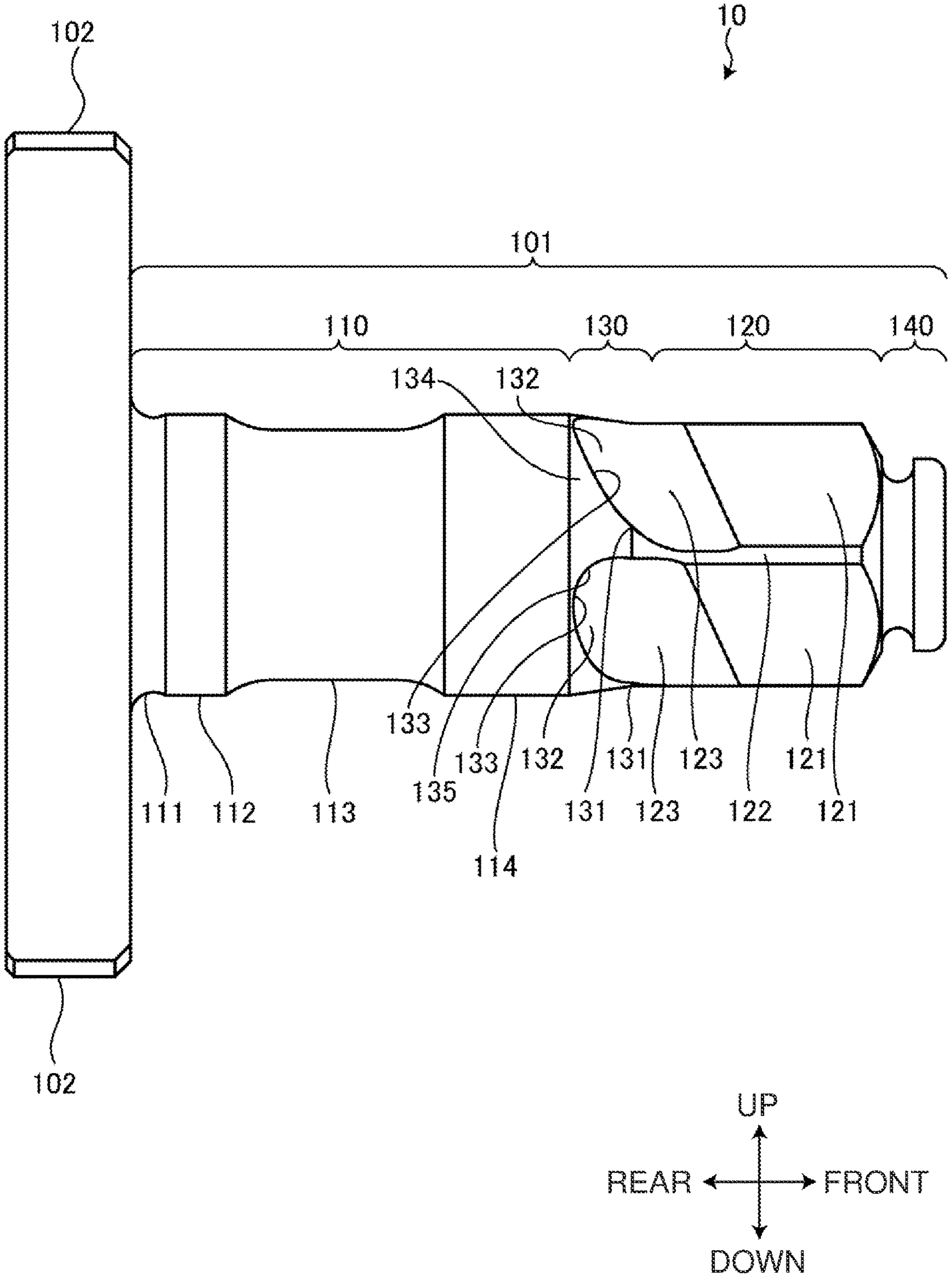
FIG. 8 is a side view of the anvil in the embodiment.
Figure 9:
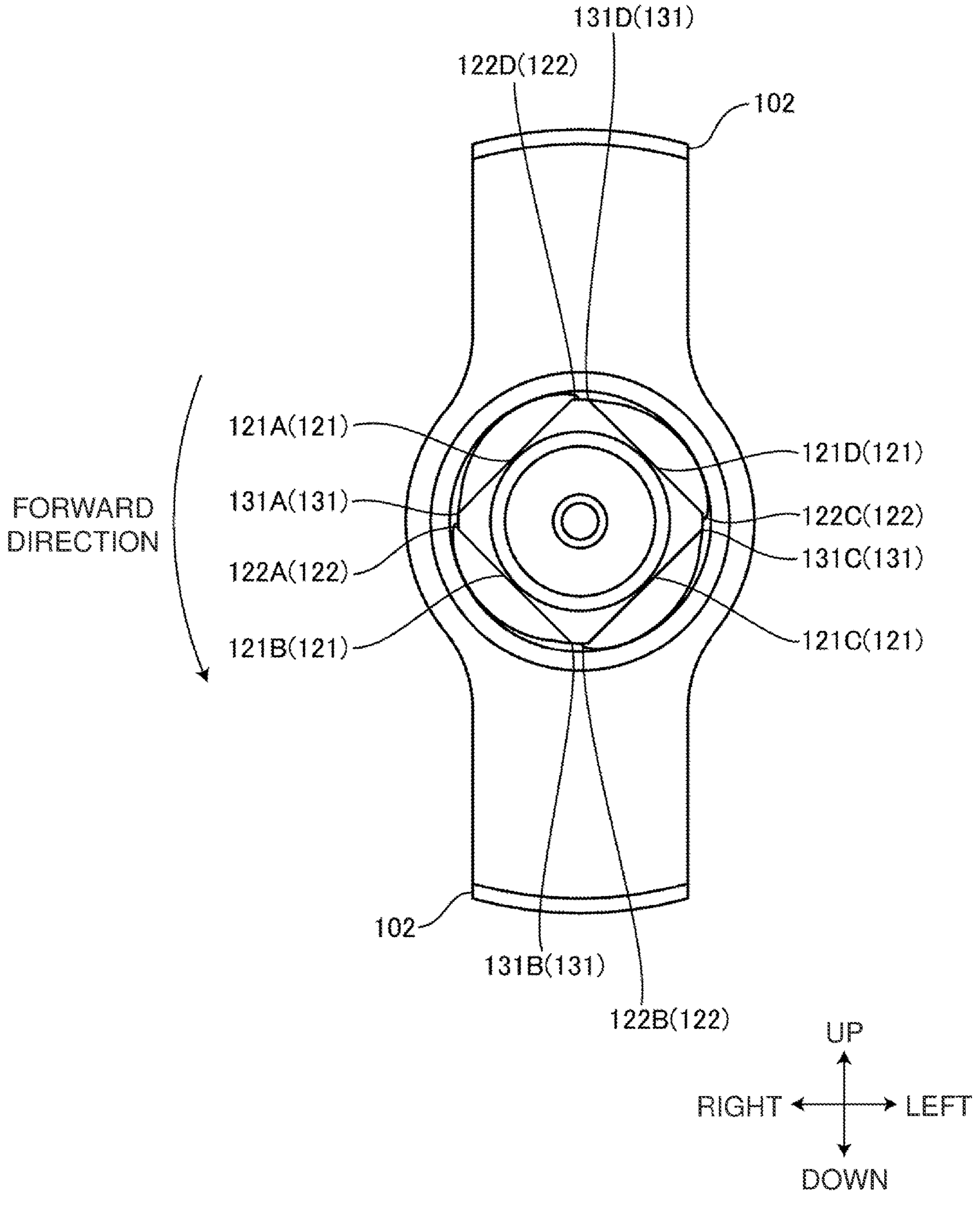
FIG. 9 is a front view of the anvil in the embodiment.
Figure 10:
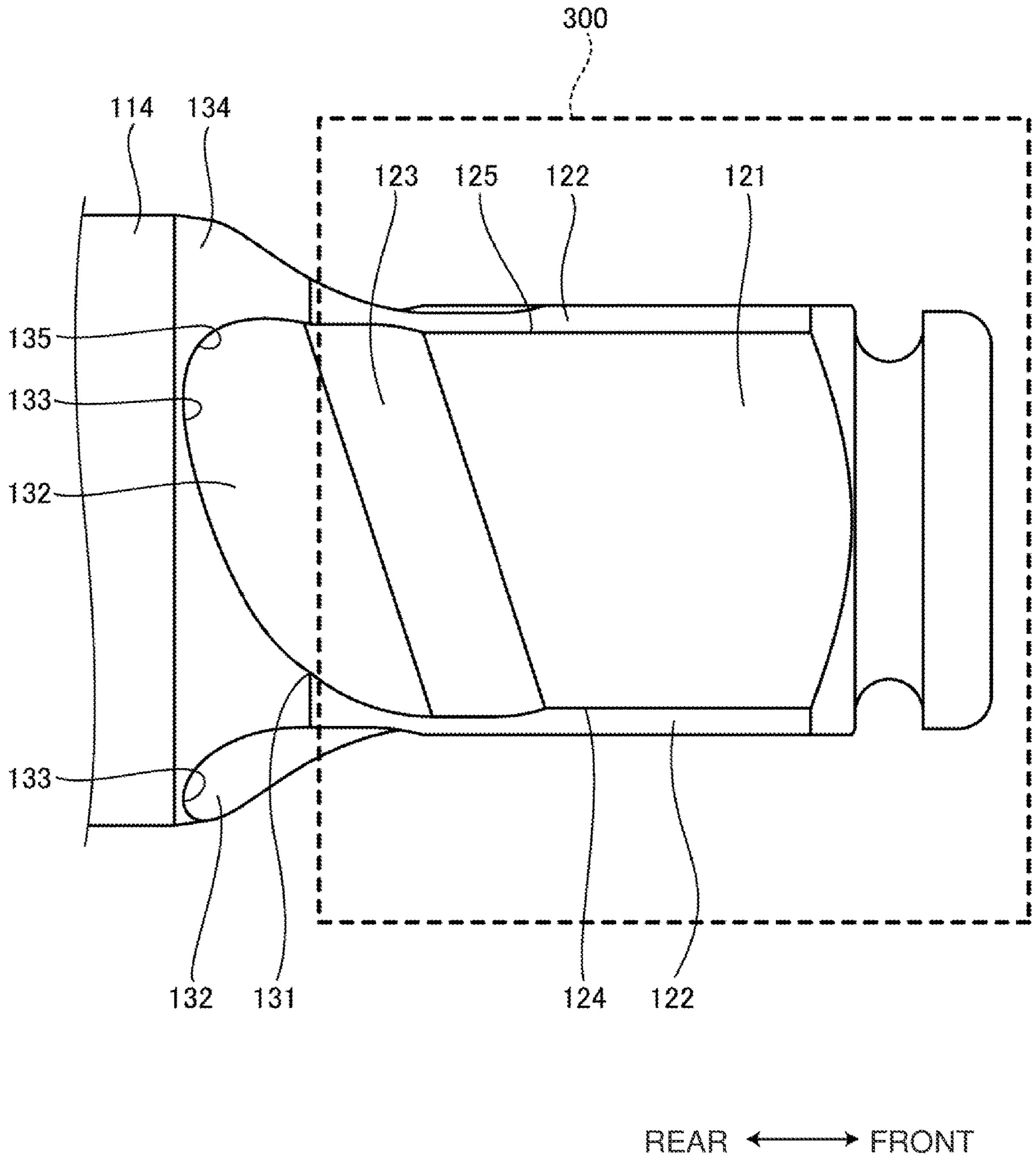
FIG. 10 is a partially enlarged view of the anvil in the embodiment.

FIG. 7 is a perspective view of the anvil 10 in the embodiment as viewed from the right front. FIG. 8 is a side view of the anvil 10. FIG. 9 is a front view of the anvil 10. FIG. 10 is a partially enlarged view of the anvil 10.

The anvil 10 includes the anvil shaft 101 and two anvil projections 102. The anvil shaft 101 extends in the axial direction. The anvil projections 102 protrude radially outward from the anvil shaft 101.

The anvil shaft 101 includes a first shaft 110, a second shaft 120, a transition portion 130, and a distal end 140. The first shaft 110 has its rear end connected to the anvil projections 102. The second shaft 120 is located frontward from the first shaft 110. The transition portion 130 is between the first shaft 110 and the second shaft 120 in the front-rear direction. The first shaft 110 has its front end connected to the rear end of the transition portion 130. The second shaft 120 has its rear end connected to the front end of the transition portion 130. The first shaft 110 and the second shaft 120 are connected with the transition portion 130 in between. The distal end 140 is located frontward from the second shaft 120.

The first shaft 110 is located inside the hammer case 4. The first shaft 110 is at least partially supported by the anvil bearing 46. The first shaft 110 has a circular cross section orthogonal to the rotation axis AX. The first shaft 110 includes a recess 111, the rear columnar portion 112, the recess 113, and the front columnar portion 114. The recess 111 is located rearward from the rear columnar portion 112. The recess 111 is at the boundary between the anvil shaft 101 and the anvil projections 102. The recess 111 has a smaller outer diameter than the rear columnar portion 112. As shown in FIG. 5, the rear columnar portion 112 is supported by the rear support 462 in the anvil bearing 46. The outer circumferential surface of the rear columnar portion 112 is in contact with the inner circumferential surface 462S of the rear support 462. The recess 113 is located frontward from the rear columnar portion 112. The recess 113 has a smaller outer diameter than the rear columnar portion 112. The front columnar portion 114 is located frontward from the recess 113. The outer diameter of the front columnar portion 114 is substantially equal to the outer diameter of the rear columnar portion 112. As shown in FIG. 5, the front columnar portion 114 is supported by the front support 463 in the anvil bearing 46. The outer circumferential surface of the front columnar portion 114 is in contact with the inner circumferential surface 463S of the front support 463.

The second shaft 120 is located outside the hammer case 4. The second shaft 120 protrudes frontward through the opening at the front end of the hammer case 4. A socket 300 is attached to the second shaft 120. The second shaft 120 has a substantially rectangular cross section orthogonal to the rotation axis AX. The second shaft 120 has four flat surfaces 121 and four corners 122. As shown in FIG. 9, the flat surfaces 121 include a flat surface 121A, a flat surface 121B, a flat surface 121C, and a flat surface 121D. The flat surface 121B is adjacent to the flat surface 121A in the circumferential direction. The flat surface 121C is adjacent to the flat surface 121B in the circumferential direction. The flat surface 121D is adjacent to the flat surface 121C in the circumferential direction. The corners 122 include a corner 122A, a corner 122B, a corner 122C, and a corner 122D. The corner 122A is at the boundary between the flat surface 121A and the flat surface 121B. The corner 122B is at the boundary between the flat surface 121B and the flat surface 121C. The corner 122C is at the boundary between the flat surface 121C and the flat surface 121D. The corner 122D is at the boundary between the flat surface 121D and the flat surface 121A.

As shown in FIG. 10, each flat surface 121 has a first edge 124 extending in the front-rear direction and a second edge 125 extending in the front-rear direction. The first edge 124 is located at the end of the flat surface 121 in the first circumferential direction. The second edge 125 is located at the end of the flat surface 121 in the second circumferential direction. The four flat surfaces 121 each has the first edge 124 and the second edge 125.

As indicated by the arrow in FIG. 9, the anvil 10 rotates in the forward direction when rotating counterclockwise as viewed from the front. The first edge 124 is located farther in the forward direction than the second edge 125. The anvil 10 is rotated in the first circumferential direction for tightening a bolt received in the socket 300. In other words, the anvil 10 is rotated in the forward direction in the bolt tightening operation.

The transition portion 130 connects the first shaft 110, which is a cylinder, and the second shaft 120, which is a square prism. The transition portion 130 at least partially and smoothly connects the outer circumferential surface of the front columnar portion 114 of the first shaft 110 and the outer surface of the second shaft 120. The transition portion 130 includes support portions 131 and joints 135. Each support portion 131 is connected to the corresponding first edge 124 of the second shaft 120. Each joint 135 is connected to the corresponding second edge 125 of the second shaft 120. The support portion 131 are substantially aligned with the first edges 124 in the circumferential direction. The joints 135 are substantially aligned with the second edges 125 in the circumferential direction. In other words, each support portion 131 immediately follows the corresponding first edge 124 (is located on an extension from the first edge 124 rearward). Each joint 135 immediately follows the corresponding second edge 125 (is located on an extension from the second edge 125 rearward). The joints 135 are located rearward from the support portions 131 in the front-rear direction. The transition portion 130 is connected to the second edges 125 at positions rearward from the support portions 131.

The transition portion 130 is connected to the four first edges 124. The transition portion 130 is connected to the four second edges 125. The support portions 131 are four support portions 131 located at intervals in the circumferential direction. The joints 135 are four joints 135 located at intervals in the circumferential direction. As shown in FIG. 9, the support portions 131 include a support portion 131A, a support portion 131B, a support portion 131C, and a support portion 131D. The support portion 131A is connected to the first edge 124 of the flat surface 121A. The support portion 131B is connected to the first edge 124 of the flat surface 121B. The support portion 131C is connected to the first edge 124 of the flat surface 121C. The support portion 131D is connected to the first edge 124 of the flat surface 121D.

The socket 300 attached to the second shaft 120 has its rear end in contact with the four support portions 131. The rear end of the socket 300 attached to the second shaft 120 is not in contact with the four joints 135.

The transition portion 130 includes a tapered portion 134 connected to the front columnar portion 114. The tapered portion 134 has its rear end connected to the front end of the front columnar portion 114. The tapered portion 134 has an outer diameter gradually decreasing toward the front. The tapered portion 134 has its front end connected to the flat surfaces 121 and the corners 122. The tapered portion 134 is partially removed to define the support portions 131 and the joints 135. The tapered portion 134 has curved surfaces in its partially removed portions. The transition portion 130 has curved surfaces 132 connected to the flat surfaces 121. The curved surfaces 132 are between the joints 135 and the support portions 131 in the circumferential direction. Curves 133 are defined at the boundaries between the outer surface of the tapered portion 134 and the curved surfaces 132. Each curve 133 connects the corresponding joint 135 and support portion 131. The curve 133 slopes frontward in the first circumferential direction (forward direction).

In the embodiment, each flat surface 121 partially has a recess 123. The recess 123 is recessed radially inward from the flat surface 121. The recess 123 is a strip and slopes frontward in the first circumferential direction (forward direction). The recess 123 may be eliminated.

Operation of Impact Tool

The operation of the impact tool 1 will now be described. In an operation for tightening a bolt on a workpiece, for example, the operator grips the grip 22 with, for example, the right hand, and pulls the trigger lever 14 with the right index finger. Power is then supplied from the battery pack 25 to the motor 6 to activate the motor 6 and turn on the light 17 at the same time. In response to the activation of the motor 6, the rotor shaft 33 rotates. A rotational force of the rotor shaft 33 is then transmitted to the planetary gears 42 through the pinion gear 41. The planetary gears 42 revolve about the pinion gear 41 while rotating and meshing with the internal teeth on the internal gear 43. The planetary gears 42 are rotatably supported by the spindle 8 with the pin 42P. The revolving planetary gears 42 rotate the spindle 8 at a lower rotational speed than the rotor shaft 33.

As the spindle 8 rotates with the hammer projections 475 and the anvil projections 102 in contact with each other, the anvil 10 rotates together with the hammer 47 and the spindle 8. The bolt tightening operation proceeds in this manner.

When the anvil 10 receives a predetermined or higher load in the bolt tightening operation, the anvil 10 and the hammer 47 stop rotating. As the spindle 8 rotates in this state, the hammer 47 moves backward. Thus, the hammer projections 475 and the anvil projections 102 come out of contact from each other.

When moving backward, the hammer 47 rotates relative to the spindle shaft 801. The washer 61 is spaced from the hammer 47 and the spindle 8. The rotation of the hammer 47 is thus not restricted by the washer 61. The support balls 54 are between the washer 61 and the hammer 47. The support balls 54 rotate to allow the hammer 47 to rotate smoothly.

The hammer 47 that has moved backward then moves forward while rotating under elastic forces from the first coil spring 51 and the second coil spring 52. Thus, the anvil projections 102 are struck by the hammer projections 475 in the rotation direction. The anvil 10 thus rotates about the rotation axis AX at high torque. The bolt is thus tightened into the workpiece at high torque.

Method for Manufacturing Impact Wrench

In the above structure, for example, when the anvil shaft 101 is changed to another anvil shaft 101 with a different outer diameter, the support 80 is selected based on the outer diameter of the changed anvil shaft 101. The seal 70 is then retained in the hammer case 4. The impact tool 1 described above is hereafter referred to as a first impact wrench 1 as appropriate. An impact tool including an anvil shaft 101B with an outer diameter different from the anvil shaft 101 in the first impact wrench 1 is hereafter referred to as a second impact wrench 1B as appropriate.

The first impact wrench 1 includes the anvil shaft 101 (first anvil shaft), the hammer case 4 (first hammer case), the anvil bearing 46 (first anvil bearing), and the seal 70 (first seal). The anvil bearing 46 is between the anvil shaft 101 and the hammer case 4. The seal 70 is retained by the support 80 separate from the hammer case 4.

Figure 11:
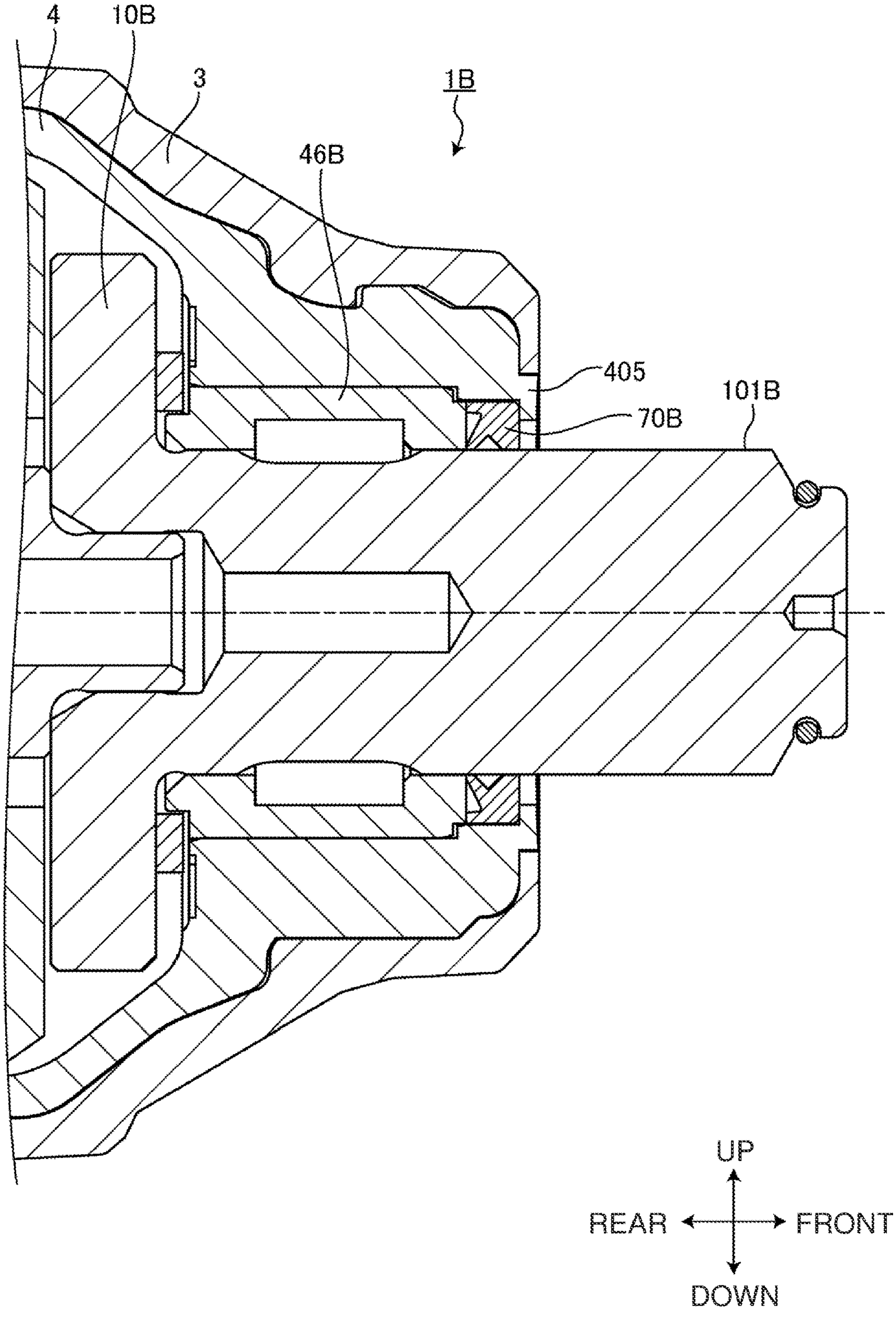
FIG. 11 is a partially enlarged longitudinal sectional view of a second impact wrench according to the embodiment.

FIG. 11 is a partially enlarged longitudinal sectional view of the second impact wrench 1B in the embodiment. In the example shown in FIG. 11, the second impact wrench 1B includes the anvil shaft 101B (second anvil shaft), the hammer case 4, an anvil bearing 46B (second anvil bearing), and a seal 70B (second seal). The anvil shaft 101B has a larger outer diameter than the anvil shaft 101 (first anvil shaft). The hammer case 4 has the same shape and dimensions as the hammer case 4 in the first impact wrench 1. The anvil bearing 46B is between the anvil shaft 101B and the hammer case 4. The seal 70B is retained by the hammer case 4.

The second impact wrench 1B includes the anvil shaft 101B with a large outer diameter. The seal 70B is thus located radially outward from the seal 70 in the first impact wrench 1. In manufacturing the second impact wrench 1B, the seal 70B is retained by the fourth cylinder 405 at the front end of the hammer case 4, without the support 80 being included in the structure or without the dimensions of the opening of the hammer case 4 being changed. As with the first impact wrench 1 including the anvil shaft 101 with a smaller outer diameter, the support 80 can be used to retain the seal 70, eliminating any change in the dimensions of the opening of the hammer case 4. In manufacturing the impact wrench (1, 1B), the anvil shafts (101, 101B) with different outer diameters may be used. Different types of impact wrench (1, 1B) that can retain the seal (70, 70B) can be manufactured using the hammer case 4 with the same shape and dimensions but including or not including the support 80. Impact wrench manufacturers may simply use the support 80 to manufacture multiple different impact wrenches (1, 1B) that include the anvil shafts (101, 101B) with different outer diameters and can retain the seals (70, 70B), rather than using multiple different hammer cases 4. The first impact wrench 1 and the second impact wrench 1B can thus be manufactured by the same manufacturer.

The impact tool 1 according to the embodiment includes the motor 6 including the rotor 27 rotatable about the rotation axis AX extending in the front-rear direction, the spindle 8 rotatable with a rotational force from the rotor 27, the anvil 10 located frontward from at least a part of the spindle 8 and including the anvil shaft 101 extending in the axial direction parallel to the rotation axis AX and the anvil projections 102 protruding outward from the anvil shaft 101 in the radial direction of the rotation axis AX, the hammer 47 supported by the spindle 8 and including the hammer projections 475 striking the anvil projections 102 in the rotation direction, the hammer case 4 accommodating the hammer 47 and at least a part of the anvil 10 and having the opening receiving the anvil shaft 101, the anvil bearing 46 fixed to the hammer case 4 inside the hammer case 4 and supporting the anvil shaft 101, the seal 70 at the boundary between the anvil bearing 46 and the anvil shaft 101 inside the hammer case 4, and the support 80 facing the opening of the hammer case 4 inside the hammer case 4 and supporting the seal 70 from the front. The support 80 has a smaller inner diameter than the opening of the hammer case 4.

In the above structure, the seal 70 reduces the likelihood that the lubricant oil contained in the hammer case 4 leaks outside the hammer case 4 through the opening of the hammer case 4. The seal 70 also reduces the likelihood that foreign objects outside the hammer case 4 enter the hammer case 4 through the opening of the hammer case 4. The support 80 reduces the likelihood that the seal 70 slips off through the opening of the hammer case 4. The support 80 has a smaller inner diameter than the hammer case 4. The support 80 thus reduces the likelihood of a leak of the lubricant oil or entry of foreign objects. When, for example, the dimensions of the opening of the hammer case 4 are changed, the support 80 is changed based on the changed dimensions of the opening of the hammer case 4. This reduces the likelihood of the seal 70 slipping off, and thus reduces a leak of the lubricant oil or entry of foreign objects.

The support 80 in the embodiment faces the seal 70.

The support 80 thus reduces the likelihood that the seal 70 slips off through the opening of the hammer case 4.

The support 80 in the embodiment surrounds at least a part of the anvil shaft 101.

The support 80 thus supports the seal 70 stably.

The support 80 in the embodiment includes the washer surrounding the anvil shaft 101.

The washer is in contact with the seal 70 under a uniform force. The washer reduces the likelihood that a large force is applied locally to the seal 70.

The seal 70 in the embodiment is at least partially in contact with the anvil shaft 101. The support 80 is spaced from the anvil shaft 101.

With the support 80 spaced from the anvil shaft 101, the anvil 10 can rotate smoothly.

The support 80 in the embodiment is fixed to at least one of the hammer case 4 or the anvil bearing 46.

This reduces changes in the relative positions between the support 80, the hammer case 4, and the anvil bearing 46.

The support 80 in the embodiment is held between the anvil bearing 46 and a part of the hammer case 4 in the front-rear direction.

This reduces changes in the relative positions between the support 80, the hammer case 4, and the anvil bearing 46. The impact tool 1 is thus assembled easily.

In the embodiment, the seal 70 is supported by the anvil bearing 46.

This reduces changes in the relative positions between the support 80 and the anvil bearing 46.

OTHER EMBODIMENTS

Figure 12:
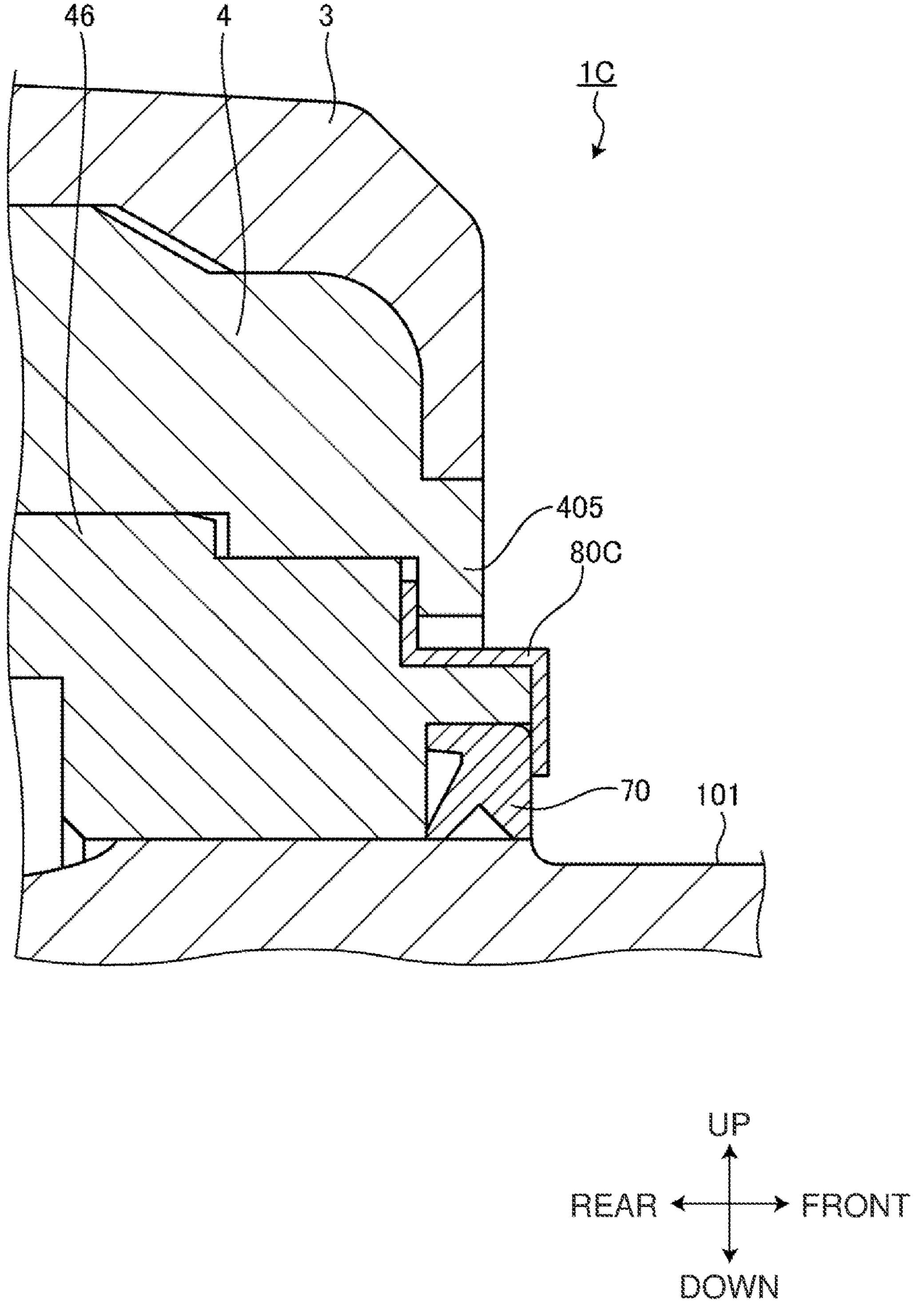
FIG. 12 is a partially enlarged longitudinal sectional view of an impact tool according to another embodiment.

FIG. 12 is a partially enlarged longitudinal sectional view of an impact tool 1C according to another embodiment. In the above embodiment, the support 80 faces the opening of the hammer case 4 inside the hammer case 4. As shown in FIG. 12, a support 80C may be at least partially located outside the hammer case 4 and facing the opening of the hammer case 4. The support 80C includes its rear portion held between the anvil bearing 46 and the fourth cylinder 405 and fixed to the hammer case 4. The support 80C is bent partially. The support 80C includes its front portion located frontward from the opening of the hammer case 4. In the example shown in FIG. 12, the support 80C supports the seal 70 from the front and retains the seal 70.

The anvil bearing 46 in the above embodiment is an iron sleeve. The anvil bearing 46 may be a needle bearing or a ball bearing.

In the above embodiment, the impact tool 1 is an impact wrench. The impact tool 1 may be an impact driver.

In the above embodiment, the impact tool 1 may use utility power (alternating current power supply) in place of the battery pack 25.

REFERENCE SIGNS LIST

1 impact tool
2 housing
2L left housing
2R right housing
2S screw
2T screw
3 cover

4 hammer case
6 motor
7 reducer
8 spindle
9 striker
10 anvil
12 fan
13 battery mount
14 trigger lever
15 forward-reverse switch lever
16 operation display
16A operation button
16B indicator
17 light
19 inlet
20 outlet
21 motor compartment
22 grip
23 battery holder
24 bearing box
25 battery pack
26 stator
27 rotor
28 stator core
29 front insulator
30 rear insulator
31 coil
32 rotor core
33 rotor shaft
34 rotor magnet
37 sensor board
38 busbar unit
39 rotor bearing
39F front rotor bearing
39R rear rotor bearing
41 pinion gear
42 planetary gear
42P pin
43 internal gear
44 spindle bearing
46 anvil bearing
47 hammer
48 hammer ball
50 coil spring
51 first coil spring
52 second coil spring
53 washer
54 support ball
61 washer
62 washer
70 seal
71 outer ring
72 rear lip
73 front lip
80 support
101 anvil shaft
102 anvil projection
103 recess
110 first shaft
111 recess
112 rear columnar portion
113 recess
114 front columnar portion
120 second shaft
121 flat surface
121A flat surface
121B flat surface
121C flat surface
121D flat surface
122 corner
122A corner
122B corner
122C corner
122D corner
123 recess
124 first edge
125 second edge
130 transition portion
131 support portion
131A support portion
131B support portion
131C support portion
131D support portion
132 curved surface
133 curve
134 tapered portion
135 joint
140 distal end
241 recess
242 recess
300 socket
401 first cylinder
402 second cylinder
402R rear surface
402S inner circumferential surface
403 case connector
404 third cylinder
404R rear surface
404S inner circumferential surface
405 fourth cylinder
405R rear surface
405S inner circumferential surface
461 outer ring
461F front surface
461R rear surface
461S inner circumferential surface
461T outer circumferential surface
462 rear support
462F front surface
462S inner circumferential surface
463 front support
463F front surface
463R rear surface
463S inner circumferential surface
464 rear protrusion
464R rear surface
464T outer circumferential surface
465 front protrusion
465F front surface
465S inner circumferential surface
465T outer circumferential surface
466 recess
471 base
473 rear ring
474 support ring
474A larger-diameter portion
474B smaller-diameter portion
474C step
475 hammer projection
476 recess
477 hammer groove
478 support groove
801 spindle shaft
802 flange

803 protrusion
804 spindle groove
AX rotation axis

What is claimed is:

1. An impact tool, comprising:
a motor including a rotor;
a striker rotatable by the rotor;
an anvil strikable by the striker;
a hammer case having an opening;
an anvil bearing fixed to the hammer case inside the hammer case, the anvil bearing supporting the anvil;
a seal between the anvil bearing and the anvil inside the hammer case; and
a support facing the opening and supporting the seal from a front, the support having a smaller inner diameter than the opening.

2. The impact tool according to claim 1, wherein
the support faces the seal.

3. The impact tool according to claim 1, wherein
the support surrounds at least a part of the anvil.

4. The impact tool according to claim 1, wherein
the support includes a washer surrounding the anvil.

5. The impact tool according to claim 1, wherein
the seal is at least partially in contact with the anvil, and the support is spaced from the anvil.

6. The impact tool according to claim 1, wherein
the support is fixed to at least one of the hammer case or the anvil bearing.

7. The impact tool according to claim 6, wherein
the support is held between the anvil bearing and a part of the hammer case in a front-rear direction.

8. The impact tool according to claim 1, wherein
the seal is supported by the anvil bearing.

9. The impact tool according to claim 2, wherein
the support surrounds at least a part of the anvil.

10. The impact tool according to claim 2, wherein
the support includes a washer surrounding the anvil.

11. The impact tool according to claim 3, wherein
the support includes a washer surrounding the anvil.

12. The impact tool according to claim 2, wherein
the seal is at least partially in contact with the anvil, and the support is spaced from the anvil.

13. The impact tool according to claim 3, wherein
the seal is at least partially in contact with the anvil, and the support is spaced from the anvil.

14. The impact tool according to claim 4, wherein
the seal is at least partially in contact with the anvil, and the support is spaced from the anvil.

15. The impact tool according to claim 2, wherein
the support is fixed to at least one of the hammer case or the anvil bearing.

16. The impact tool according to claim 3, wherein
the support is fixed to at least one of the hammer case or the anvil bearing.

17. The impact tool according to claim 4, wherein
the support is fixed to at least one of the hammer case or the anvil bearing.

18. The impact tool according to claim 5, wherein
the support is fixed to at least one of the hammer case or the anvil bearing.

19. An impact tool, comprising:
a motor including a rotor;
a striker rotatable by the rotor;
an anvil strikable by the striker;
a hammer case accommodating the striker and a part of the anvil, the hammer case having an opening receiving the anvil;
an anvil bearing fixed to the hammer case inside the hammer case, the anvil bearing supporting the anvil;
a seal between the anvil bearing and the anvil inside the hammer case, the seal being retained by the anvil bearing; and
a support supporting the seal and having a smaller inner diameter than the opening.

20. A method for manufacturing an impact wrench, the method comprising:
manufacturing a first impact wrench including a first anvil shaft, a first hammer case, a first anvil bearing between the first anvil shaft and the first hammer case, and a first seal retained by a support separate from the first hammer case; and
manufacturing a second impact wrench including a second anvil shaft having a larger outer diameter than the first anvil shaft, the first hammer case, a second anvil bearing between the second anvil shaft and the first hammer case, and a second seal retained by the first hammer case.

* * * * *